Oct. 11, 1960    M. G. COMUNTZIS    2,955,470
MAGNETIC-CONTACT ACCELEROMETER
Filed Feb. 19, 1959    3 Sheets-Sheet 1

Marcus G. Comuntzis,
INVENTOR.
BY J. J. Rotondi,
A. T. Dupont,
H. M. Snyder, and
Alvin E. Moore,
ATTORNEYS.

Oct. 11, 1960  M. G. COMUNTZIS  2,955,470
MAGNETIC-CONTACT ACCELEROMETER
Filed Feb. 19, 1959  3 Sheets-Sheet 2

Marcus G. Comuntzis,
*INVENTOR.*
BY S. J. Rotondi,
A. T. Dupont,
H. M. Snyder, and
Alvin E. Moore,
ATTORNEYS.

Oct. 11, 1960 M. G. COMUNTZIS 2,955,470
MAGNETIC-CONTACT ACCELEROMETER
Filed Feb. 19, 1959 3 Sheets-Sheet 3

Marcus G. Comuntzis,
INVENTOR.

S. J. Rotondi,
BY A. T. Dupont,
H. N. Snyder, and
Alvin E. Moore,
ATTORNEYS.

United States Patent Office 2,955,470
Patented Oct. 11, 1960

2,955,470
MAGNETIC-CONTACT ACCELEROMETER

Marcus G. Comuntzis, Pasadena, Calif., assignor to the United States of America as represented by the Secretary of the Army Filed Feb. 19, 1959, Ser. No. 794,483
2 Claims. (Cl. 73—492)

This invention relates to a magnetic-contact accelerometer. Such an accelerometer, of the chatter type, provides means for determining levels of acceleration, shock and vibration on components tested in the laboratory.

When missiles, aircraft, or machine elements are subjected to peaks of acceleration, shock or vibration in laboratory testing, there is a need for such a chatter type accelerometer that will measure peaks of acceleration in excess of one $g$. There are further needs for an accelerometer, which does not depend on springs in its operation and for an accelerometer that will measure various ranges of acceleration.

In view of these facts, an object of this invention is to provide a chatter accelerometer which will operate at levels above one $g$.

Another object of the invention is to eliminate the springs normally required in chatter accelerometers.

A further object is to provide an accelerometer which has means whereby the range of the accelerometer can be varied.

The foregoing and other objects of this invention will become more fully apparent from the following detailed description and from the accompanying drawings, in which.

Figure 2:
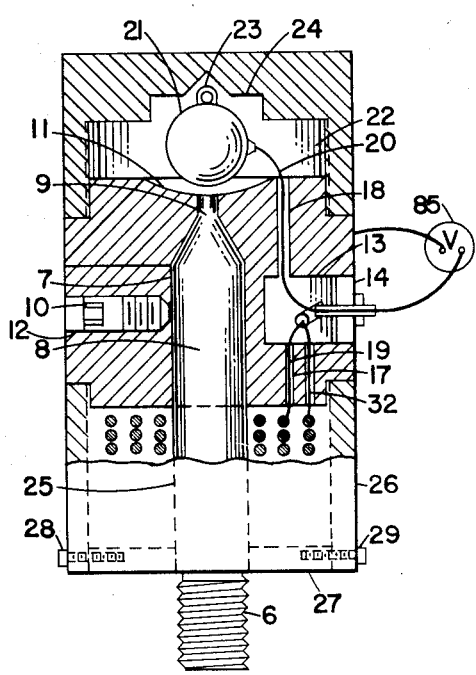
Figure 2 is a view that is partially in section, taken along the line 2—2 of Figure 1.
Figure 1:
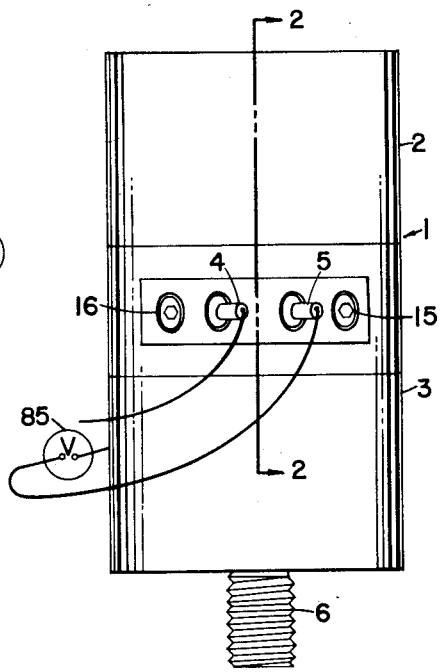
Figure 1 is an elevational view of the electromagnetic accelerometer.

In the drawings, wherein for the purpose of illustration there are shown three embodiments of the invention and particularly in Figures 1 and 2, a generally cylindrical accelerometer is comprised of a nonmagnetic body member 1, which may be of plastic or nonmagnetic metal such as aluminum, a nonmagnetic cap 2, a flux-density coil assembly 3, a power connection 4, a meter connection 5, and mounting means 6. The accelerometer more specifically comprises a central bore 7, an electromagnet armature 8, terminating in a pole piece 9, adapted to be fitted in the bore 7, a set screw 10, adapted to fit screwthreaded opening 12, for holding the armature 8 in place and a recess 11 in the end of the body 1 confronting the cap 2.

The mid-section of body member 1 contains a niche 13 for receiving a crescent like connecting bracket 14, which is secured to body 1 by screws 15 and 16. The power and meter connections 4 and 5 are attached to this bracket.

A pair of apertures 17 and 18 are open to niche 13 at one of each of the apertures' ends. The other end of aperture 17 terminates at coil assembly 3; and the other end of 18 terminates at the edge of parti-spherical recess 11. These apertures serve as passageways for power lead 19 from connector 4 to coil 3, and for meter lead 20 from the meter connection 5 to a magnetic metal ball 21, located in chamber 22.

The ball 21 is freely mounted within the limitations of chamber 22. The chamber 22 is formed between cap 2 and the upper end of body 1 when the cap 2 is in position on the body 1, that is after the instrument has been calibrated and is in use. The ball 21 has a flattened surface, which contains an upwardly disposed calibration eyelet 23. Eyelet 23 is adapted to receive a hook or other connector 68A of a force measuring means 68, for calibration purposes, as indicated in connection with a second embodiment, shown in Figure 4.

A second recess 24 is formed in cap 2 and confronts recess 11. Recess 24 serves as a keeper and guide means for retaining the loosely fitted ball 21 in position on top of the pole piece 9.

The end of armature 8, opposite from pole piece 9, passes thru an opening 25 in the coil of coil assembly 3, and terminates in a screw-threaded mounting means 6.

The coil assembly 3 comprises a nonmagnetic sleeve 26 and an end plate 27. The end plate is press-fitted on armature 8, and is secured to sleeve 26 by screws 28 and 29. The coil assembly is then secured to body 1 by the action of set screw 10 on armature 8.

The form of the invention in Figures 1 and 2 is shown as comprising a voltmeter 85, which enables the operator to ascertain when the accelerometer has been subjected to a predetermined level of acceleration. At this time, ball 21 leaves its seat 11 and breaks the circuit containing voltmeter 85, whereupon the voltmeter ceases to register voltage, indicating that said level has been reached. The predetermined level may be adjusted by varying the current supplied from power supply 30 to the coil of the electromagnet.

Figure 8:
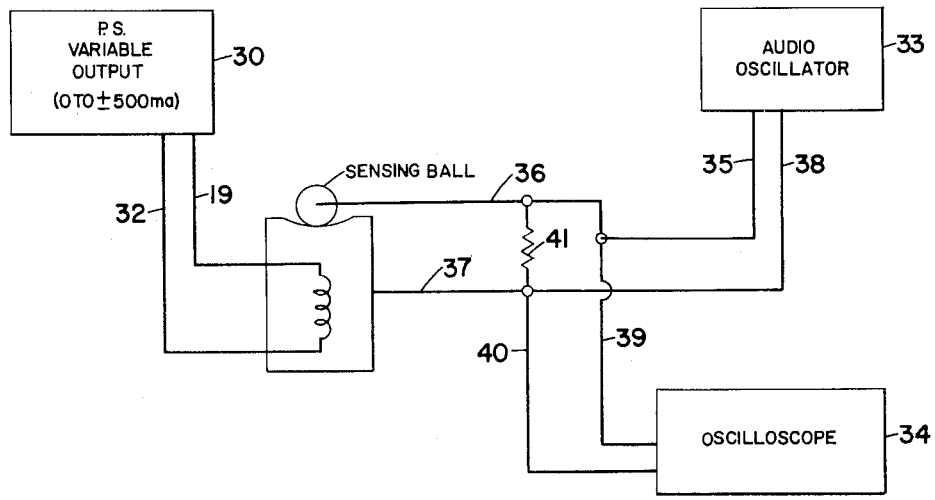
Figure 8 shows a preferred circuit for use with the electromagnetic accelerometer.

The circuit shown in Figure 8 may be utilized with this electromagnetic form of the accelerometer in lieu of the voltmeter circuit. In Figure 8, as in Figure 2, variable output power supply 30 is connected with the electromagnet by conductors 19 and 32, and the indicating means is connected via conductors to the casing of the instrument and to the ball. In Figure 8 the indicating means is shown as comprising an audio oscillator 33 and an oscilloscope 34, connected in parallel. Audio oscillator 33 receives current from an electrical source as indicated in Figure 8 and supplies alternating voltage to a circuit comprising conductors 35, 36, 37 and 38. This circuit has less resistance than the parallel circuit containing the oscilloscope. When acceleration-caused movement of ball 21 breaks the circuit thru the ball, voltage from 33 goes thru conductors 39 and 40 and the oscilloscope, thus indicating that a predetermined level of acceleration has been reached. At this time voltage does not short-circuit thru resistor 41, due to the fact that said resistor has more resistance than the oscilloscope.

The operation of the form of the devices shown in Figures 1, 2 and 8 is as follows:

The accelerometer is mounted on the element to be tested and power to the coil adjusted to the desired amount.

Figure 4:
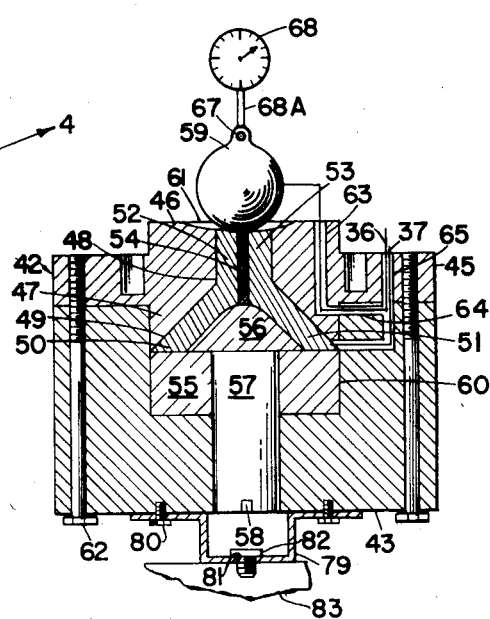
Figure 4 is a sectional view taken along line 4—4 of Figure 3, but showing the cap removed and a calibration device in use.

A force measuring means, shown in Figure 4, is then connected to the calibration eyelet 23, and the force necessary to separate the ball 21 from the magnet is measured.

The acceleration necessary for the separation of the ball from the magnet is then calculated by dividing the separation force by the mass of the ball 21.

This procedure would be carried out various times for various given amounts of amperage supplied by the power source, and from the resulting data a calibration chart may be made, showing the different accelerations obtainable with different power ratings.

When the calibration is obtained from a chart or directly from testing, as described above, and the voltmeter or, alternatively, the circuit shown in Figure 8, is connected to the ball and casing and the coil, the element is ready to be tested.

If the circuit of Figure 8 is being utilized, the oscillator is turned on, so as to send a signal thru the ball. When the ball is in place this signal will be shorted back to the oscillator, but when the tested element is subjected to the calibrated acceleration the ball will be unseated and the short circuit opened, and the signal is supplied to the oscilloscope, due to the resistor 41, so as to indicate on the oscilloscope that the calibrated acceleration has been reached.

The acceleration value then can be changed as described above and the element subjected to a different acceleration value.

Figure 3:
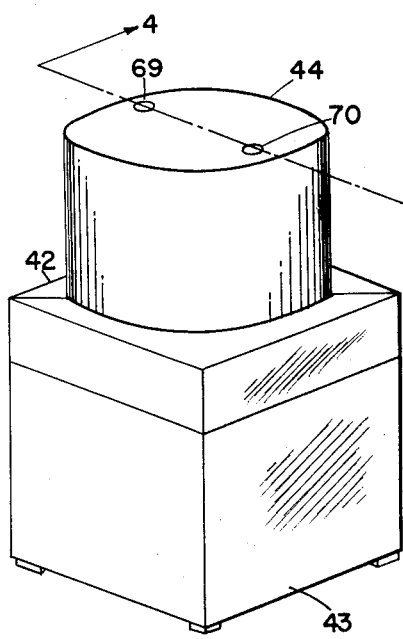
Figure 3 is a perspective view of an embodiment, comprising a permanent magnet.
Figure 5:
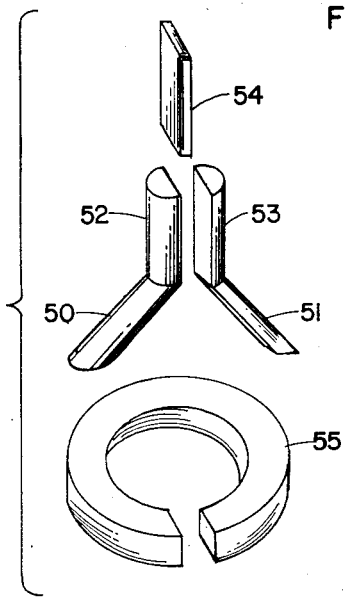
Figure 5 is an exploded view of the two pole pieces, nonmagnetic metal piece and the magnet shown in Figure 4.

In the embodiment shown in Figures 3 to 5, a permanent magnet is used in the accelerometer.

In this embodiment the exterior of the accelerometer comprises a nonmagnetic body 42, a square, nonmagnetic metal base 43 and a nonmagnetic cap 44.

The body 42 is comprised of a substantially square metal piece 45, partially conforming to the shape of the top of base 43. This piece has a pair of generally cylindrical portions 46 and 47, one being located above and the other below said substantially square metal piece.

The upper portion 46 has an internal bore 48, and lower portion 47 has an internal conical surface 49 which joins bore 48.

Within and against conical surface 49 there are located two legs of magnet pole pieces 50 and 51, which join at their upper parts in integral, parti-annular magnetic elements 52 and 53 which fit within bore 48. Said elements or upper pole piece portions are separated by nonmagnetic metal piece 54. Magnetic elements 50 to 53 thus form two pole pieces which rest on permanent magnet 55, which is rotatably mounted in bore 60 in the top of base 43. Nonmagnetic filler piece 56 optionally fills the space between nonmagnetic metal piece 54 and the top of rotatable nonmagnetic rod 57, which is press-fitted in magnet 55. This rod may be turned by means of a screwdriver fitted in kerf 58, so as to vary the intensity of the magnetic force transmitted thru the pole pieces to ball 59 which is seated in recess 61. The magnetic force from magnet 55 is caused to take an indirect path from one of the pole pieces to the other, via ball 59, because of the nonmagnetic element 54.

Base 43 is secured to body 42 by a plurality of mounting studs 62.

A conductor 36 has one end connected to ball 59. The other end is passed thru bores 63, 64 and 65 to an exterior indicator circuit.

Ball 59 has a calibration eyelet 67 for receiving hook 68A of force measuring device 68.

Cap 44 is fitted over cylindrical portion 46 enclosing conductor 36 and ball 59. This cap is secured in position over portion 46 by screws 69 and 70.

Figure 7:
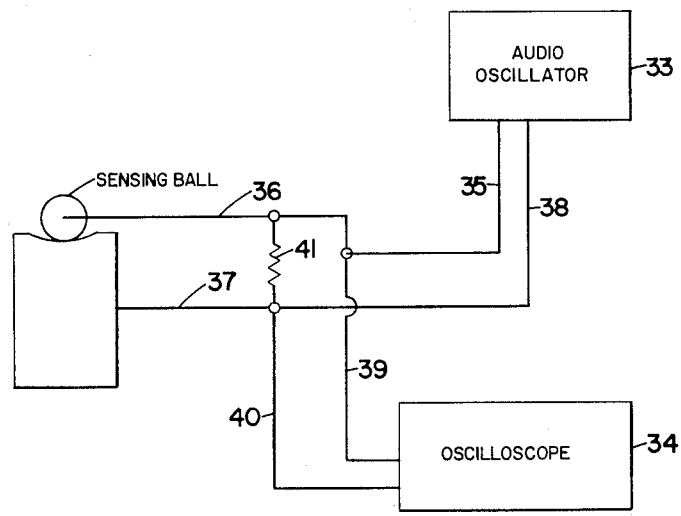
Figure 7 shows a preferred circuit for use with the permanent magnet accelerometer of Figures 3 to 5.

The circuit used in this embodiment is the same as the circuit of Figure 8, used in the embodiment shown in Figures 1 and 2, except that power supply 30 is eliminated and conductor 37 is connected to pole piece 51. Therefore, components common to Figures 7 and 8 are indicated by the same reference numerals.

The operation of this embodiment is as follows:

Rod 57 is turned until magnet 55 is rotated to a desired position. The remainder of the operation, for obtaining the ball-separating acceleration, is the same as in the operation for Figures 1, 2 and 8.

The results obtained from various rotary positions of rotary rod 57 may be indicated by a single mark on the base of the rod, which in rotating registers with one of various marks on fixed base 43, near rod 57. This would enable the user to dial the acceleration desired by lining up the marks corresponding to the acceleration.

In Figure 4, a second form of accelerometer mounting means is shown. Bracket 79 is fastened to base 43 by means of screws 80, and may be attached to the element 82 to be tested under accelerations by bolts 83 extending thru hole 81. This bracket is open on two of its sides, so that a tool may be inserted for adjustment of the magnet without the necessity of removing the bracket from base 43 or from said element.

Figure 6:
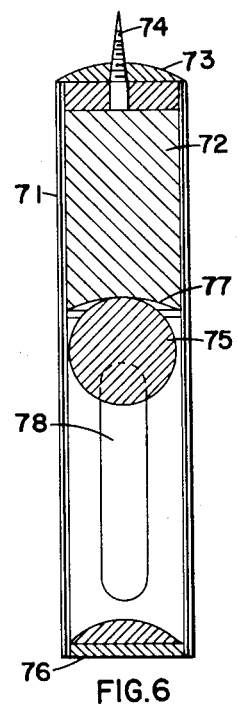
Figure 6 is a sectional view of another embodiment comprising a permanent magnet.

The embodiment shown in Figure 6 illustrates a type of accelerometer that comprises a permanent magnet and means on the accelerometer for observing the action of the magnetic ball.

In this embodiment the numeral 71 indicates a nonmagnetic metal cylinder having a permanent cylindrical bar magnet 72 that is secured in the cylinder by end plate 73 that is press-fitted or otherwise fixed to the cylinder. Mounting means 74 may be screwed into the base or another part of the element to be tested. A magnetic metal ball 75 is located in one end of cylinder 71, supported for substantially free movement and adapted to fit a recess 77 formed in the end of the magnet opposite from plate 73. A pair of oblong observation slots 78 are located in the wall of said end of the cylinder. A second end plate 76 is press-fitted or otherwise fixed to said end of the cylinder.

In the use of this embodiment it is necessary to choose an accelerometer that has a mass of the ball and a magnet adapted to fit the desired acceleration.

The chosen accelerometer would be good for one acceleration value and if a different acceleration is desired an accelerometer designed for the different acceleration must be used. Alternatively, using only one basic accelerometer, the mass of the ball and/or the magnetic force could be varied by substitution of different balls and/or magnets.

The operation of this embodiment is as follows:

When the acceleration for the test is determined an accelerometer having a magnet and ball of the necessary characteristics is selected. This accelerometer is connected to the member to be tested and is subjected to acceleration.

When the member reaches the predetermined acceleration, the ball separates from the magnet. This separation will be indicated by the movement of the ball relative to the observation slots.

This form of invention may be utilized to indicate various accelerations by the provision of gradation marks on cylinder 71 adjacent slots 78, each mark indicating the extent of travel of the ball (against magnetic force) for a given acceleration.

It is to be understood that the forms of the invention that are herein shown and described are preferred embodiments, and that various changes in the shape, size and arrangement of parts may be resorted to without departing from the spirit of the invention, or the scope of the subjoined claims.

The following invention is claimed:

1. An accelerometer comprising: a nonmagnetic housing having an axis; a nonmagnetic detachable cap secured to said housing, providing a substantial space between the central part of said cap and said housing; screwthreaded means for mounting said housing on an element to be tested; a ball of magnetic material supported in said housing in said space, having a diameter shorter than the extent of said space along said axis, for limited relative movement in said space under acceleration of said element; a magnet within said housing adjacent said ball, for exerting magnetic force on said ball in opposition to said accelerations; two pole pieces of magnetic material mounted in said housing, each extending from a point closely adjacent said magnet to a point adjacent said ball, said pole pieces having a space between them; a nonmagnetic rod fixed within said magnet and having a kerf at one of its ends for coaction with a screw driver for rotating said magnet and its poles relative to said pole pieces; a seat for said ball, said seat being within said housing and having a recess of varying depth with the point of greatest depth being at said axis, said ball being drawn by said magnetic force toward said point; and means to indicate when said ball leaves said seat under the influence of said acceleration.

2. A device as set forth in claim 1, in which said magnet is mounted in said housing at a constant distance in all positions of its rotation by said rod.

References Cited in the file of this patent

UNITED STATES PATENTS

| | | |
|---|---|---|
| 1,842,384 | Blanchard | Jan. 26, 1932 |
| 2,165,894 | Hohndorf | July 11, 1939 |
| 2,774,062 | Lin | Dec. 11, 1956 |
| 2,868,611 | Carleton | Jan. 13, 1959 |
| 2,873,103 | Hautly | Feb. 10, 1959 |
| 2,888,530 | Horton | May 26, 1959 |
| 2,890,303 | Clurman | June 9, 1959 |
| 2,898,415 | Clurman | Aug. 4, 1959 |
| 2,921,999 | Ziegler | Jan. 19, 1960 |

FOREIGN PATENTS

| | | |
|---|---|---|
| 625,511 | Great Britain | June 29, 1949 |
| 779,194 | Great Britain | July 17, 1957 |